(No Model.)
J. N. STEVENSON.
WEEDING AND THINNING DEVICE FOR GROWING PLANTS.
No. 313,631. Patented Mar. 10, 1885.
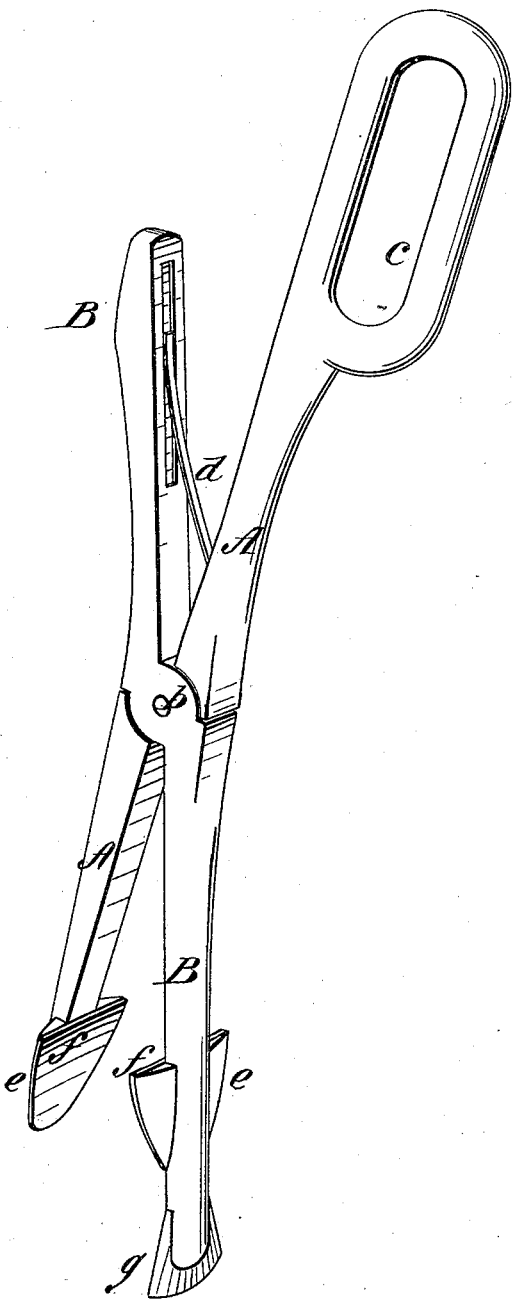
WITNESSES:
Donn Twitchell
C. Sedgwick
INVENTOR:
J. N. Stevenson
BY Munn & Co
ATTORNEYS.

UNITED STATES PATENT OFFICE.

JAMES N. STEVENSON, OF SALVISA, KENTUCKY.

WEEDING AND THINNING DEVICE FOR GROWING PLANTS.

SPECIFICATION forming part of Letters Patent No. 313,631, dated March 10, 1885.

Application filed October 14, 1884. (No model.)

*To all whom it may concern:*

Be it known that I, JAMES N. STEVENSON, of Salvisa, in the county of Mercer and State of Kentucky, have invented certain new and useful Improvements in Weeding and Thinning Devices for Growing Plants, of which the following is a full, clear, and exact description.

This invention, although applicable to weeding and thinning purposes generally, is more particularly designed to be used as an implement for thinning growing corn.

It is well known that in planting corn farmers are apt to sow more corn in certain portions of a patch than in others, and this to an extent that materially interferes with or impairs the healthy growth and full development of the plant. It consequently is necessary to thin the young corn in order that the remaining portion of the plant may be healthier and better developed. This, as ordinarily done, is a laborious operation and necessitates a stooping posture, which is painful to the back of the operator.

My invention consists in a hand implement of peculiar construction whereby such and other like work may be performed with greater ease and efficiency, substantially as hereinafter described.

Reference is to be had to the accompanying drawing, forming part of this specification, which represents a view in perspective of an implement embodying my invention.

The implement is of a tongs-like construction, having two crossing limbs, A B, pivoted, as at *b*. Its extreme length may be about three feet, (more or less,) to provide for the working of it without much or any severe stooping.

In operating the implement the fingers of the one hand of the operator are inserted in the back loop, *c*, of the limb A, while the thumb is applied to the rear end of the limb B, to close or press the limbs together as against a spring, *d*, which serves to throw the limbs apart. The forward portions of said limbs are provided with lips *e*, arranged to face each other, and preferably faced with rubber or flexible material, *f*, and the extreme forward end of the limb B is furthermore provided with a steel or other cutting-blade, *g*.

When thinning corn, the operator, holding the implement as described, projects the blade *g* into the ground close to the surplus corn and so as to cut the roots to prevent said corn from breaking when extracting it. The limbs A B are then closed upon each other to bring the lips *e e* together on the severed or surplus corn, so as to hold the same, and by pulling on the implement to extract or remove said surplus corn without stooping or hurting the back of the operator.

The object of facing the lips *e e* with rubber is to give them a soft and secure hold upon the corn, and so that when pressed together they will hold and remove, without breaking or cutting, the corn.

Having thus described my invention, what I claim as new, and desire to secure by Letters Patent, is—

1. In a hand implement for thinning corn and other weeding purposes, the combination of pivoted crossing limbs or levers A B, retracting-spring *d*, and lips *e*, the limb B extending below the lips and provided with a cutting-blade, substantially as and for the purpose set forth.

2. In a hand implement for thinning corn and other weeding or thinning purposes, in which pivoted crossing limbs are used, the lips *e e* of said limbs fitted with a soft or yielding covering, *f*, on their faces, one of said limbs also having a cutter, *g*, disposed in advance of said lips, substantially as and for the purpose specified.

JAMES N. STEVENSON.

Witnesses:
S. B. WILSON,
GREEN MILLION.